(12) United States Patent
Chuang

(10) Patent No.: US 11,791,849 B2
(45) Date of Patent: Oct. 17, 2023

(54) DIPLEXER AND RADIO FREQUENCY CIRCUIT

(71) Applicant: Wistron NeWeb Corporation, Hsinchu (TW)

(72) Inventor: Fu-Chi Chuang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 350 days.

(21) Appl. No.: 17/203,951

(22) Filed: Mar. 17, 2021

(65) Prior Publication Data

US 2021/0344363 A1 Nov. 4, 2021

(30) Foreign Application Priority Data

Apr. 30, 2020 (TW) ................................. 109114611

(51) Int. Cl.
| | |
|---|---|
| *H04B 1/00* | (2006.01) |
| *H04L 5/00* | (2006.01) |
| *H04B 1/04* | (2006.01) |
| *H01P 1/213* | (2006.01) |
| *H01Q 5/335* | (2015.01) |

(52) U.S. Cl.
CPC .......... *H04B 1/0057* (2013.01); *H01P 1/2135* (2013.01); *H01Q 5/335* (2015.01); *H04B 1/0483* (2013.01); *H04L 5/00* (2013.01)

(58) Field of Classification Search
CPC ... H04B 1/0483; H04B 1/0057; H01P 1/2135; H01Q 5/335; H03H 2001/0021; H03H 7/0153; H03H 7/0115; H03H 2007/386; H03H 7/1766; H03H 7/463; H04L 5/00
See application file for complete search history.

(56) References Cited

U.S. PATENT DOCUMENTS

| | | | |
|---|---|---|---|
| 10,622,963 B2 | 4/2020 | Tsai | |
| 2004/0095919 A1* | 5/2004 | Nitani | H04B 1/005 370/343 |
| 2010/0283553 A1* | 11/2010 | Chen | H01P 1/2138 333/126 |
| 2017/0077697 A1 | 3/2017 | Girard et al. | |
| 2017/0244430 A1* | 8/2017 | Black | H04B 1/0057 |

(Continued)

FOREIGN PATENT DOCUMENTS

TW 201926892 A 7/2019

*Primary Examiner* — Awet Haile
(74) *Attorney, Agent, or Firm* — McClure, Qualey & Rodack, LLP

(57) ABSTRACT

A diplexer is proposed. The diplexer is configured to transmit a first signal having a first frequency and a second signal having a second frequency. The diplexer includes a first transmitting port, a second transmitting port, a third transmitting port, a first frequency band unit and a second frequency band unit. The first transmitting port is configured to transmit the first signal. The second transmitting port is configured to transmit the second signal. The third transmitting port is configured to transmit the first signal and the second signal. The first frequency band unit includes a first filter and a resonant circuit. The first filter is configured to filter the second signal. The resonant circuit is electrically connected to the first filter. The second frequency band unit includes at least one second filter. The at least one second filter is configured to filter the first signal.

14 Claims, 15 Drawing Sheets

(56) References Cited

U.S. PATENT DOCUMENTS

2019/0165755 A1* 5/2019 Tsai ................... H03H 7/0153
2019/0326944 A1* 10/2019 Khlat .................. H03H 7/461
2021/0337638 A1* 10/2021 Kunkee ................ H05B 6/80

* cited by examiner

DIPLEXER AND RADIO FREQUENCY CIRCUIT

RELATED APPLICATIONS

This application claims priority to Taiwan Application Serial Number 109114611, filed Apr. 30, 2020, which is herein incorporated by reference.

BACKGROUND

Technical Field

The present disclosure relates to a diplexer and a radio frequency circuit. More particularly, the present disclosure relates to a printed diplexer and a radio frequency circuit.

Description of Related Art

In recent years, a wireless network becomes more developed and widespread. The wireless network is everywhere no matter in a public space, educational place, or a house. Because the usage rate of the wireless network gets higher, the interference from other wireless channels becomes more severe. To solve this problem, several mechanisms of the interference protection appear such as frequency division.

A structure of frequency division can be an independent antenna structure or a shared antenna structure. A number of antennas of the independent antenna structure is more than a number of antennas of the shared antenna structure. Although the number of antennas of the shared antenna structure is less, a diplexer is needed to separate different operating frequencies in order to avoid interference in operating.

A radio frequency circuit of a common shared antenna structure includes an antenna, a RF cable, a RF cable connector, a diplexer, and a transceiver circuit. The above-mentioned antenna, RF cable, RF cable connector, and diplexer in assembly or SMT can increase cost.

Therefore, there is a lack of a radio frequency circuit and a printed diplexer in a shared antenna structure which are low-cost, adjustable to operate frequencies, and without a RF cable in the market. Hence, the related industries look for the solution.

SUMMARY

According to an embodiment of the present disclosure, a diplexer is configured to transmit a first signal having a first frequency and a second signal having a second frequency. The first frequency is higher than the second frequency. The diplexer includes a first transmitting port, a second transmitting port, a third transmitting port, a first frequency band unit and a second frequency band unit. The first transmitting port is configured to transmit the first signal. The second transmitting port is configured to transmit the second signal. The third transmitting port is configured to transmit the first signal and the second signal. The first frequency band unit is electrically connected between the first transmitting port and the third transmitting port. The first frequency band unit includes a first filter and a resonant circuit. The first filter is configured to filter the second signal. The resonant circuit is electrically connected to the first filter to adjust an operating frequency of the first frequency band unit. The second frequency band unit is electrically connected between the second transmitting port and the third transmitting port. The second frequency band unit includes at least one second filter. The at least one second filter is configured to filter the first signal.

According to another embodiment of the present disclosure, a diplexer is configured to transmit a first signal having a first frequency and a second signal having a second frequency. The first frequency is higher than the second frequency. The diplexer includes a first transmitting port, a second transmitting port, a third transmitting port, a first frequency band unit and a second frequency band unit. The first transmitting port is configured to transmit the first signal. The second transmitting port is configured to transmit the second signal. The third transmitting port is configured to transmit the first signal and the second signal. The first frequency band unit is electrically connected between the first transmitting port and the third transmitting port. The first frequency band unit includes a first filter. The first filter is configured to filter the second signal. The second frequency band unit is electrically connected between the second transmitting port and the third transmitting port. The second frequency band unit includes at least one second filter. The at least one second filter is configured to filter the first signal.

According to another embodiment of the present disclosure, a radio frequency circuit is configured to transmit a first signal having a first frequency and a second signal having a second frequency. The first frequency is higher than the second frequency. The radio frequency circuit includes an antenna, a diplexer, a transceiver circuit, a substrate and a grounding layer. The diplexer is electrically connected to the antenna. The diplexer includes a first transmitting port, a second transmitting port, a third transmitting port, a first frequency band unit and a second frequency band unit. The first transmitting port is configured to transmit the first signal. The second transmitting port is configured to transmit the second signal. The third transmitting port is configured to transmit the first signal and the second signal. The first frequency band unit is electrically connected between the first transmitting port and the third transmitting port. The first frequency band unit includes a first filter. The first filter is configured to filter the second signal. The second frequency band unit is electrically connected between the second transmitting port and the third transmitting port. The second frequency band unit includes at least one second filter. The at least one second filter is configured to filter the first signal. The transceiver circuit is electrically connected to the diplexer. The substrate has an upper surface and a bottom surface. The antenna, the diplexer, and the transceiver circuit are disposed at the upper surface, and the grounding layer is disposed at the bottom surface.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component. Besides, a combination of these elements (unite or circuits) of the present closure is not a common combination in this art, so it cannot be predicted whether a relation of the combination hereof can be easily done by a person having skill in the art by these elements (units or circuits).

Figure 1:
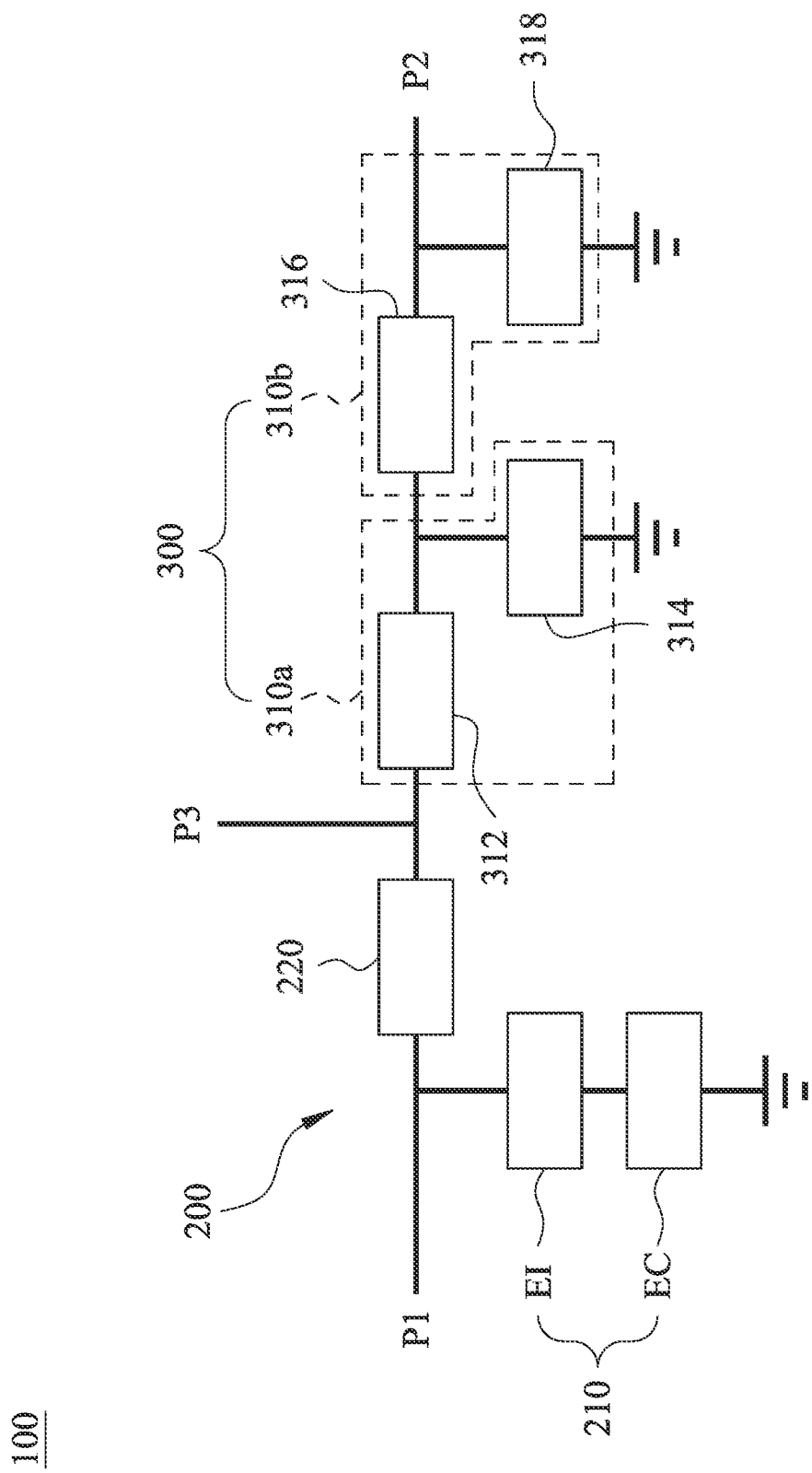
FIG. 1 is a schematic block diagram of a diplexer according to a $1^{st}$ embodiment of the present disclosure.
Figure 2:
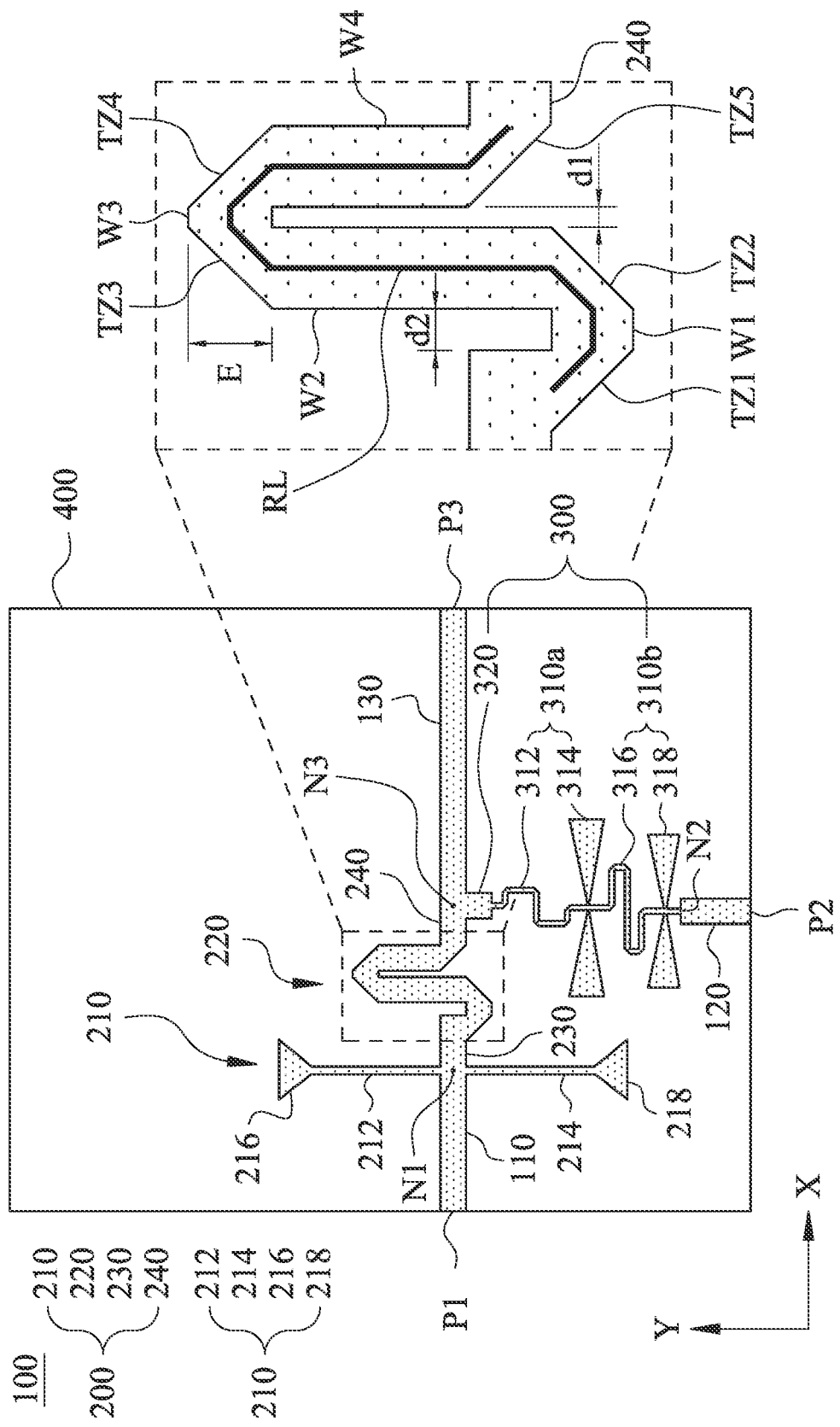
FIG. 2 is a schematic plan view of the diplexer according to FIG. 1.
Figure 3:
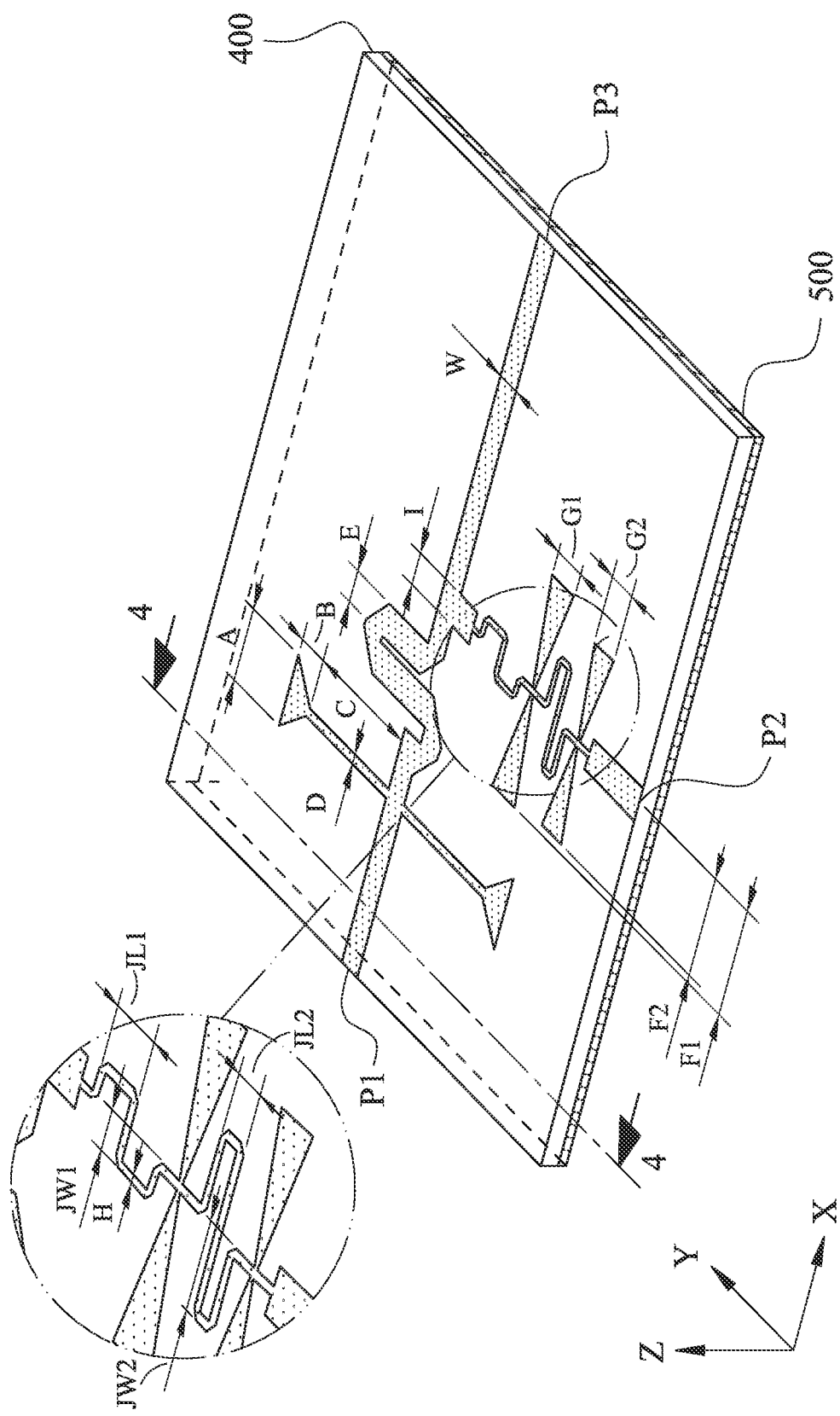
FIG. 3 is a schematic three-dimensional view of the diplexer according to FIG. 2.
Figure 4:
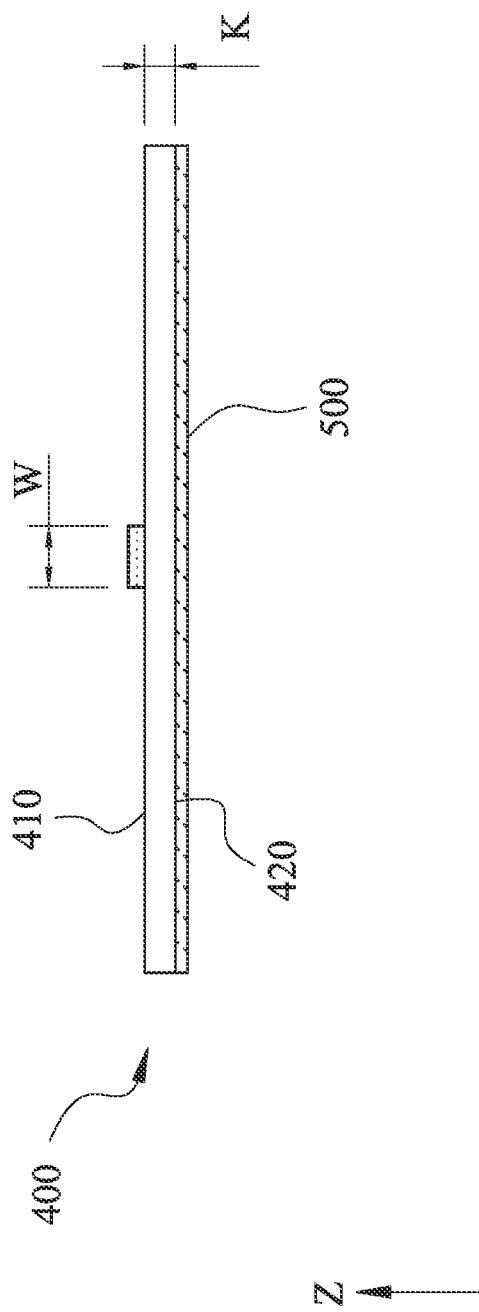
FIG. 4 is a schematic sectional view along a sectional line 4-4 of the diplexer according to FIG. 3.

Please refer from FIG. 1 to FIG. 4, wherein FIG. 1 is a schematic block diagram of a diplexer 100 according to the $1^{st}$ embodiment of the present disclosure; FIG. 2 is a schematic plan view of the diplexer 100 according to FIG. 1; FIG. 3 is a schematic three-dimensional view of the diplexer 100 according to FIG. 2; and FIG. 4 is a schematic sectional view along a 4-4 sectional line of the diplexer 100 according to FIG. 3. As the figures show, the diplexer 100 is configured to transmit a first signal having a first frequency and a second signal having a second frequency. The first frequency is higher than the second frequency. In specific, the first frequency is between 5150 MHz and 5850 MHz, and the second frequency is between 2400 MHz and 2500 MHz, but the present disclosure is not limited thereto.

The diplexer 100 includes a first transmitting port P1, a second transmitting port P2, a third transmitting port P3, a first node N1, a second node N2, a third node N3, a first transmission line 110, a second transmission line 120, a third transmission line 130, a first frequency band unit 200, a second frequency band unit 300, a substrate 400 and a grounding layer 500.

Figure 6:
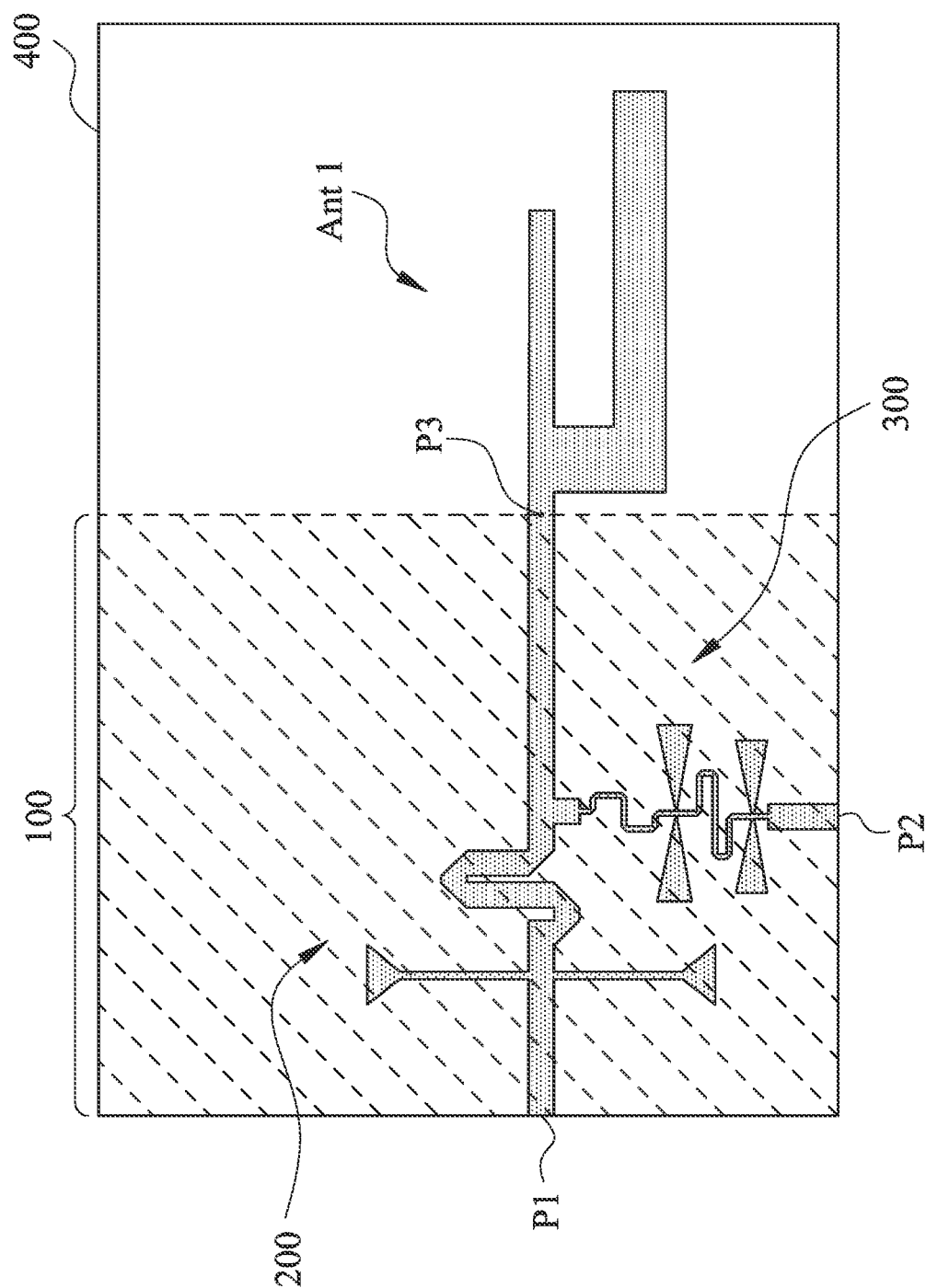
FIG. 6 is a schematic view of the diplexer combined with a first antenna according to FIG. 1.
Figure 7:
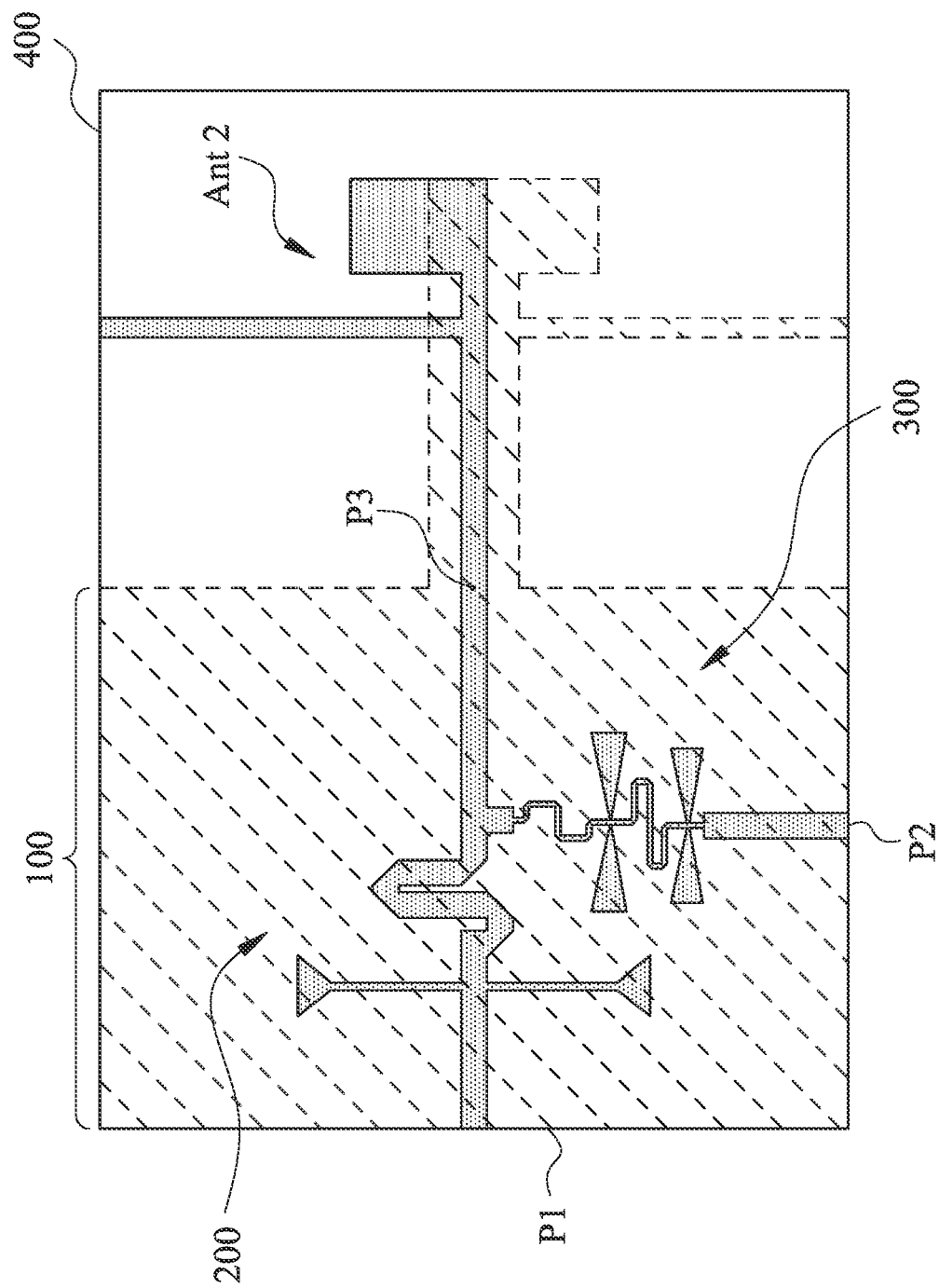
FIG. 7 is a schematic view of the diplexer combined with a second antenna according to FIG. 1.
Figure 8:
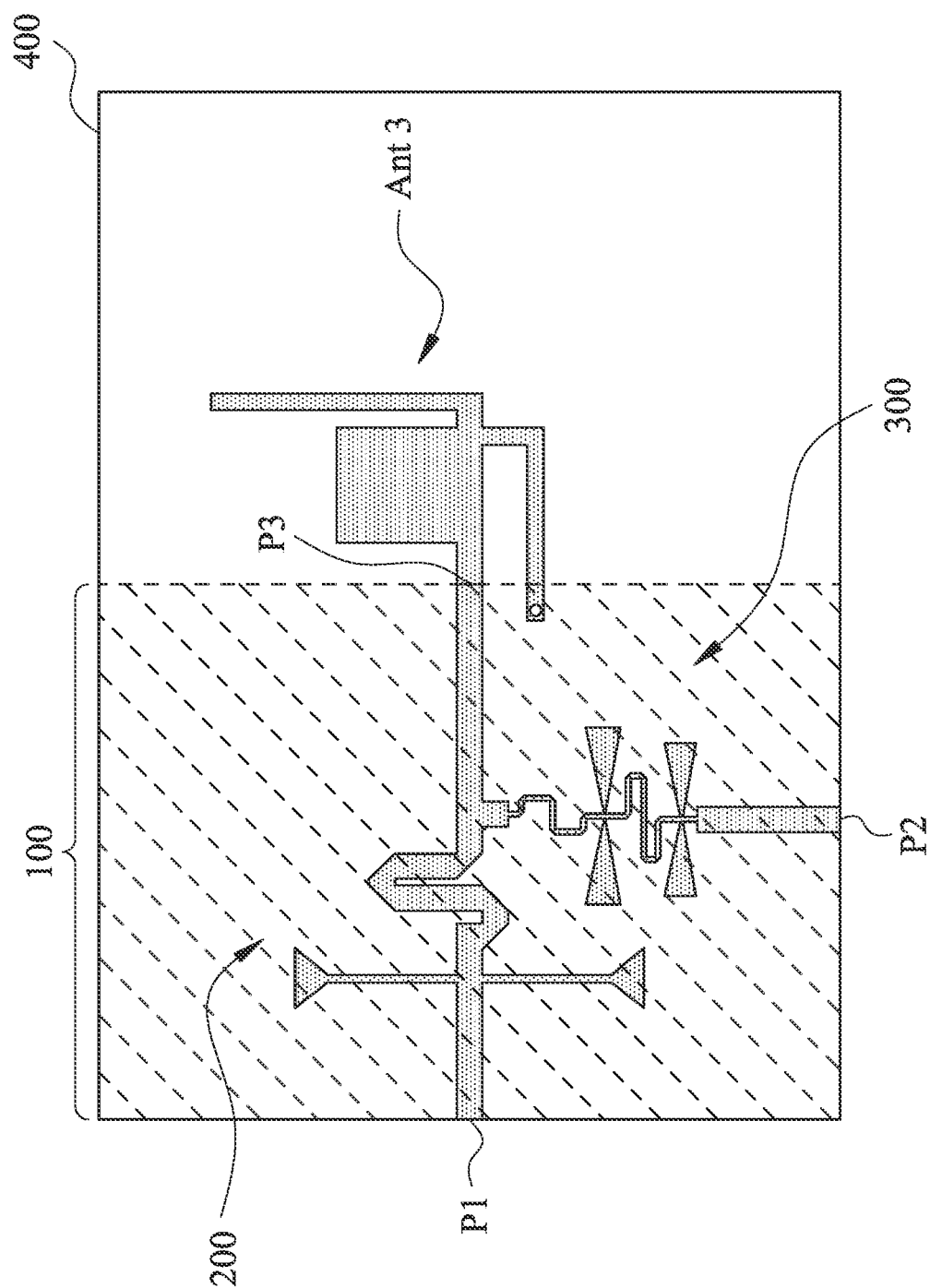
FIG. 8 is a schematic view of the diplexer combined with a third antenna according to FIG. 1.

The first transmitting port P1 is configured to transmit the first signal. The second transmitting port P2 is configured to transmit the second signal. The third transmitting port P3 is configured to transmit the first signal and the second signal, and the third transmitting port P3 is connected to an antenna (as FIG. 6, FIG. 7, and FIG. 8 show). The first node N1 is located between the first transmitting port P1 and the third transmitting port P3. The second node N2 is located between the second frequency band unit 300 and the second transmitting port P2. The third node N3 is located between the first node N1 and the third transmitting port P3.

The first transmission line 110, the second transmission line 120, and the third transmission line 130 are 50 Ohm transmission lines, wherein the first transmission line 110 is connected between the first transmitting port P1 and the first node N1; the second transmission line 120 is connected between the second transmitting port P2 and the second node N2; the third transmission line 130 is connected between the third transmitting port P3 and the third node N3. Each of the first transmission line 110, the second transmission line 120, and the third transmission line 130 has a line width W.

The first frequency band unit 200 is electrically connected between the first transmitting port P1 and the third transmitting port P3, and includes a first filter 210, a resonant circuit 220, a fourth transmission line 230 and a fifth transmission line 240, wherein the first filter 210 is configured to filter the second signal. The resonant circuit 220 is electrically connected to the first filter 210 and is configured to adjust an operating frequency of the first frequency band unit 200. In specific, the first filter 210 can be a band stop filter, but the present disclosure is not limited thereto.

The first filter 210 includes a first metal unit 212, a second metal unit 214, a third metal unit 216 and a fourth metal unit 218, wherein the first metal unit 212 is connected to the first node N1 and extends along a first direction (such as a positive Y-axis direction). The second metal unit 214 is connected to the first node N1 and extends along a second direction (such as a negative Y-axis direction), and the first direction is different from the second direction. The third metal unit 216 is connected to the first metal unit 212, and has a capacitance length A and a capacitance width B. Both of the capacitance length A and the capacitance width B are greater than or equal to the line width W. The fourth metal unit 218 is connected to the second metal unit 214, and a shape of the fourth metal unit 218 is the same as a shape of the third metal unit 216. Specifically, the first metal unit 212 and the second metal unit 214 can be rectangles, and a whole thereof can be regarded as an effective inductance EI. Each of the first metal unit 212 and the second metal unit 214 has an inductance length C and an inductance width D. The inductance length C is greater than the line width W, and the inductance width D is 0.3 times as long as the line width W. The third metal unit 216 and the fourth metal unit 218 can be triangles, and a whole thereof can be regarded as an effective capacitance EC. The capacitance length A and the capacitance width B are 2 times and 1.3 times as long as the line width W, respectively. In other embodiments, the third metal unit 216 and the fourth metal unit 218 can be squares, trapezoids, circles, semicircles, ellipses, or other shapes, but the present disclosure is not limited thereto.

The resonant circuit 220 is connected between the first node N1 and the third node N3, and includes a plurality of line segments and a plurality of turning zones. At least one coupling distance is formed between the line segments and the turning zones. A number of the abovementioned line segments and turning zones can be adjusted according to requirements. The different coupling distance can affect a return loss and a bandwidth of the operating frequency of the first frequency band unit 200.

As an example of FIG. 2, the resonant circuit 220 includes four line segments W1, W2, W3, W4 and five turning zones TZ1, TZ2, TZ3, TZ4, TZ5. Each of the line segments W1, W2, W3, W4 has a line segment width E. One of a part of the turning zones is connected between two of the line segments next to each other. For example, the turning zone TZ2 is connected between the two adjacent line segments W1, W2. The line segment width E relative to the line width W has a line-width ratio, and the line-width ratio is between 0.5 and 2 (That is, E/W=0.5-2). The different line-width ratio can affect the bandwidth of the operating frequency of the first frequency band unit 200. In the embodiment, the line-width ratio is 1, that is, the line segment width E is equal to the line width W. Besides, each of the line segments W1, W2, W3, W4 has a line segment length, and each of the turning zones TZ1, TZ2, TZ3, TZ4, TZ5 has a turning length. A total of the line segments lengths of the four line segments W1, W2, W3, W4 and the turning lengths of the five turning zones TZ1, TZ2, TZ3, TZ4, TZ5 is a resonant length RL, and the resonant length RL relative to a wavelength of the first frequency has a length ratio. The length ratio is between 0.1 and 0.5, and the length ratio of the embodiment is 0.4. Moreover, two coupling distances d1, d2 are formed among the line segments W1, W2, W3, W4 and the turning zones TZ1, TZ2, TZ3, TZ4, TZ5. Each of the two coupling distances d1, d2 relative to the line width W has a coupling ratio, and the coupling ratio is between 0.05 and 1.5. The coupling distance d1 is shorter than the coupling distance d2. Different coupling ratios can affect the return loss and the bandwidth of the operating frequency of the first frequency band unit 200. In other embodiments, the coupling distance d1 can be greater than or equal to the coupling distance d2. A shape of each of the turning zones TZ1, TZ2, TZ3, TZ4, TZ5 can be a triangle or a sector, and a different shape thereof can affect the return loss of the first frequency band unit. In the embodiment, the coupling ratio of the coupling distance d1 relative to the line width W is 0.2, the coupling ratio of the coupling distance d2 relative to the line width W is 0.5, and the shape of each of the turning zones TZ1, TZ2, TZ3, TZ4, TZ5 is a triangle.

Both of the fourth transmission line 230 and the fifth transmission line 240 are 50 Ohm transmission lines, wherein the fourth transmission line 230 is connected between the first node N1 and the resonant circuit 220; the fifth transmission line 240 is connected between the resonant circuit 220 and the third node N3.

The second frequency band unit 300 is electrically connected between the second transmitting port P2 and the third transmitting port P3 and includes at least one second filter, and the at least one second filter is configured to filter the first signal. A number of the abovementioned second filter can affect isolation. When the number of the second filter is more, the isolation is less (isolation performance is better), and vice versa. Hence, the number thereof can be adjusted according to the need of the isolation. In specific, the second filter can be a low-pass filter, but the present disclosure is not limited thereto.

As an example of FIG. 2, the second frequency band unit 300 is connected between the second node N2 and the third node N3 and includes a first-order low-pass filter 310a, a second-order low-pass filter 310b and a branch line segment 320. The first-order low-pass filter 310a includes a first-segment metal unit 312 and a second-segment metal unit 314, wherein the first-segment metal unit 312 is connected to the third node N3, and the second-segment metal unit 314 is connected between the first-segment metal unit 312 and the second node N2; the second-segment metal unit 314 has a first horizontal length F1 and a first vertical width G1. The second-order low-pass filter 310b is connected between the first-order low-pass filter 310a and the second node N2 and includes a third-segment metal unit 316 and a fourth-segment metal unit 318, wherein the third-segment metal unit 316 is connected to the second-segment metal unit 314; the fourth-segment metal unit 318 is connected between the third-segment metal unit 316 and the second node N2, and the fourth-segment metal unit 318 has a second horizontal length F2 and a second vertical width G2. The second horizontal length F2 is shorter than the first horizontal length F1 and the second vertical width G2 is shorter than the first vertical width G1. The first horizontal length F1 relative to the line width W has a horizontal length ratio, and the first vertical width relative to the line width W has a vertical width ratio. In the embodiment, the horizontal length ratio and the vertical width ratio are 3.3 and 1.5, respectively. Moreover, each of the first-segment metal unit 312 and the third-segment metal unit 316 has a metal line width H, and the metal line width H is shorter than the line width W. The metal line width H relative to the line width W has a metal line width ratio. In the embodiment, the metal line width ratio is 0.2. Besides, the branch line segment 320 is connected between the first-order low-pass filter 310a and the third node N3 and has a branch line segment width I. The branch line segment width I is equal to the line width W. The third metal unit 216, the fourth metal unit 218, the second-segment metal unit 314 and the fourth-segment metal unit 318 generate an effective capacitance with respect to the grounding layer 500 and form a coupling grounding.

In addition, both of the first-segment metal unit 312 and the third-segment metal unit 316 are curved shapes. The first-segment metal unit 312 has a curved length JL1 (along with a Y-axis direction) and a curved width JW1 (along with a X-axis direction), and the third-segment metal unit 316 has a curved length JL2 (along with the Y-axis direction) and a curved width JW2 (along with the X-axis direction). The curved length JL1 is greater than the curved length JL2, and the curved width JW1 is shorter than the curved width JW2.

The substrate 400 has an upper surface 410 and a bottom surface 420. Both of the first frequency band unit 200 and the second frequency band unit 300 are disposed at the upper surface 410. The grounding layer 500 is disposed at the bottom surface 420, and the grounding layer 500 is a metal layer. Besides, the substrate 400 is a printed circuit board (PCB) which can be FR4 or Rogers. As an example of FR4, the line width W of a part of microstrip lines on the substrate 400 (such as the first transmission line 110, the second transmission line 120, the third transmission line 130, the fourth transmission line 230 and the fifth transmission line 240) can be greater than a thickness K of the substrate 400. The exact value can be different with different materials. Hence, the printed diplexer 100 of the present disclosure not only can be applied to a shared antenna structure but also increase a bandwidth by using the resonant circuit 220 to adjust the expected operating frequency.

Figure 5:
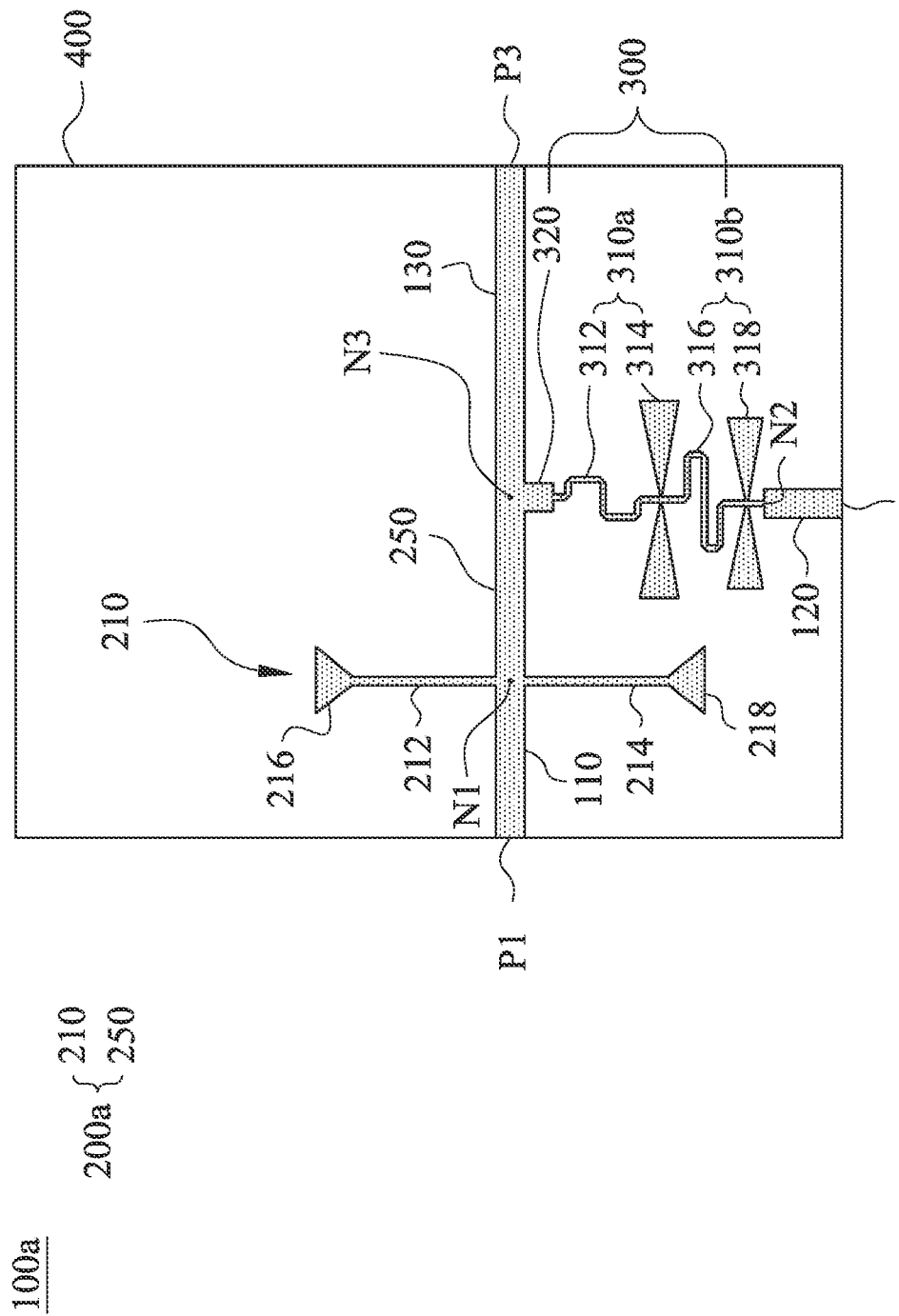
FIG. 5 is a schematic view of a diplexer according to a $2^{nd}$ embodiment of the present disclosure.

Please refer to FIG. 5, FIG. 5 is a schematic view of a diplexer 100a according to a $2^{nd}$ embodiment of the present disclosure. The diplexer 100a is configured to transmit the first signal having the first frequency and the second signal having the second frequency. The diplexer 100a includes a first transmitting port P1, a second transmitting port P2, a third transmitting port P3, a first node N1, a second node N2, a third node N3, a first transmission line 110, a second transmission line 120, a third transmission line 130, a first frequency band unit 200a, a second frequency band unit 300, a substrate 400 and a grounding layer (not shown).

Please refer to FIG. 2 and FIG. 5, in the embodiment of FIG. 5, a structure of the first transmitting port P1, the transmitting port P2, the third transmitting port P3, the first node N1, the second node N2, the third node N3, the first transmission line 110, the second transmission line 120, the third transmission line 130, the second frequency band unit 300, the substrate 400 and the grounding layer is the same as a structure corresponding to FIG. 2, so the structure is not mentioned here. In particular, in FIG. 5, the first frequency band unit 200a only includes a first filter 210 and a sixth transmission line 250, that is, excludes a resonant circuit 220.

The first filter 210 includes a first metal unit 212, a second metal unit 214, a third metal unit 216 and a fourth metal unit 218, wherein a structure thereof is the same as a structure corresponding to FIG. 2, and the structure thereof is not mentioned here. The sixth transmission line 250 is a 50 Ohm transmission line and connected between the first node N1 and the third node N3. Hence, the printed diplexer 100a of the present disclosure, compared with the printed diplexer 100 in FIG. 2, has a simpler circuit structure and a narrower bandwidth, and can also be applied to a shared antenna structure.

In addition, the impedance of the aforementioned first transmission line 110, the second transmission line 120, the third transmission line 130, the fourth transmission line 230, the fifth transmission line 240 and the sixth transmission line 250 can be other value such as 45 Ohm to 55 Ohm or 75 Ohm, and the present disclosure is not limited thereto.

Figure 9:
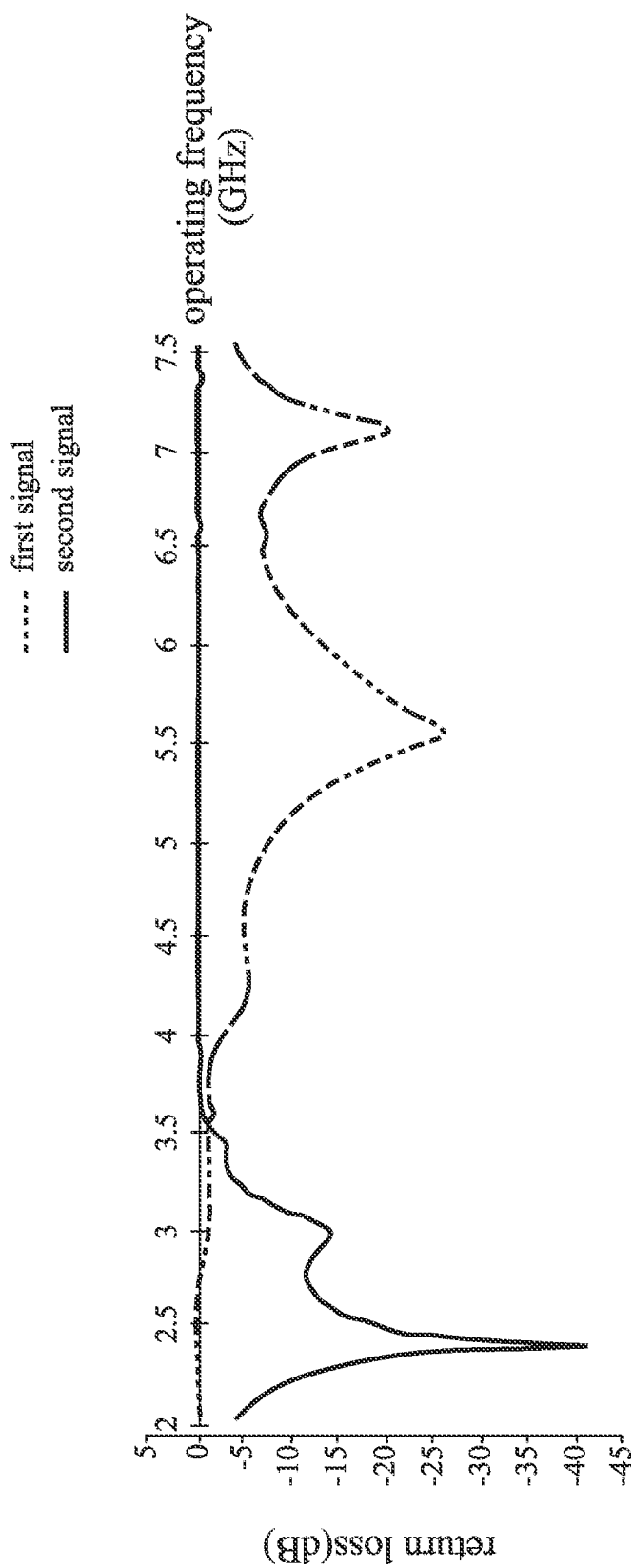
FIG. 9 is a measurement diagram of a return loss of the diplexer combined with the first antenna according to FIG. 6.
Figure 10:
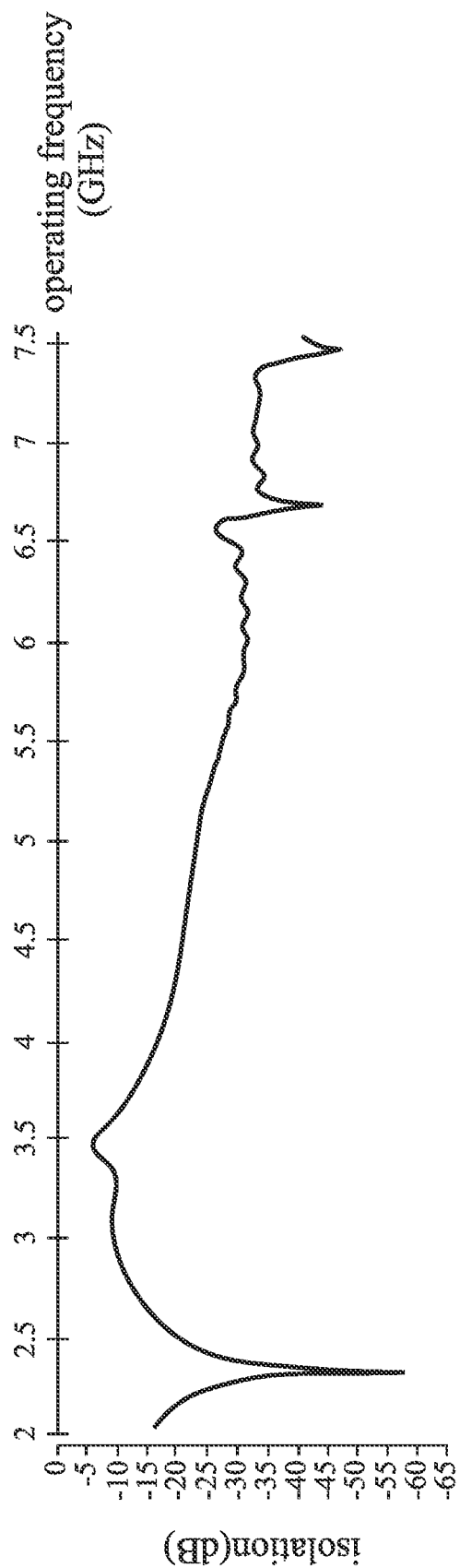
FIG. 10 is a measurement diagram of an isolation of the diplexer combined with the first antenna according to FIG. 6.
Figure 11:
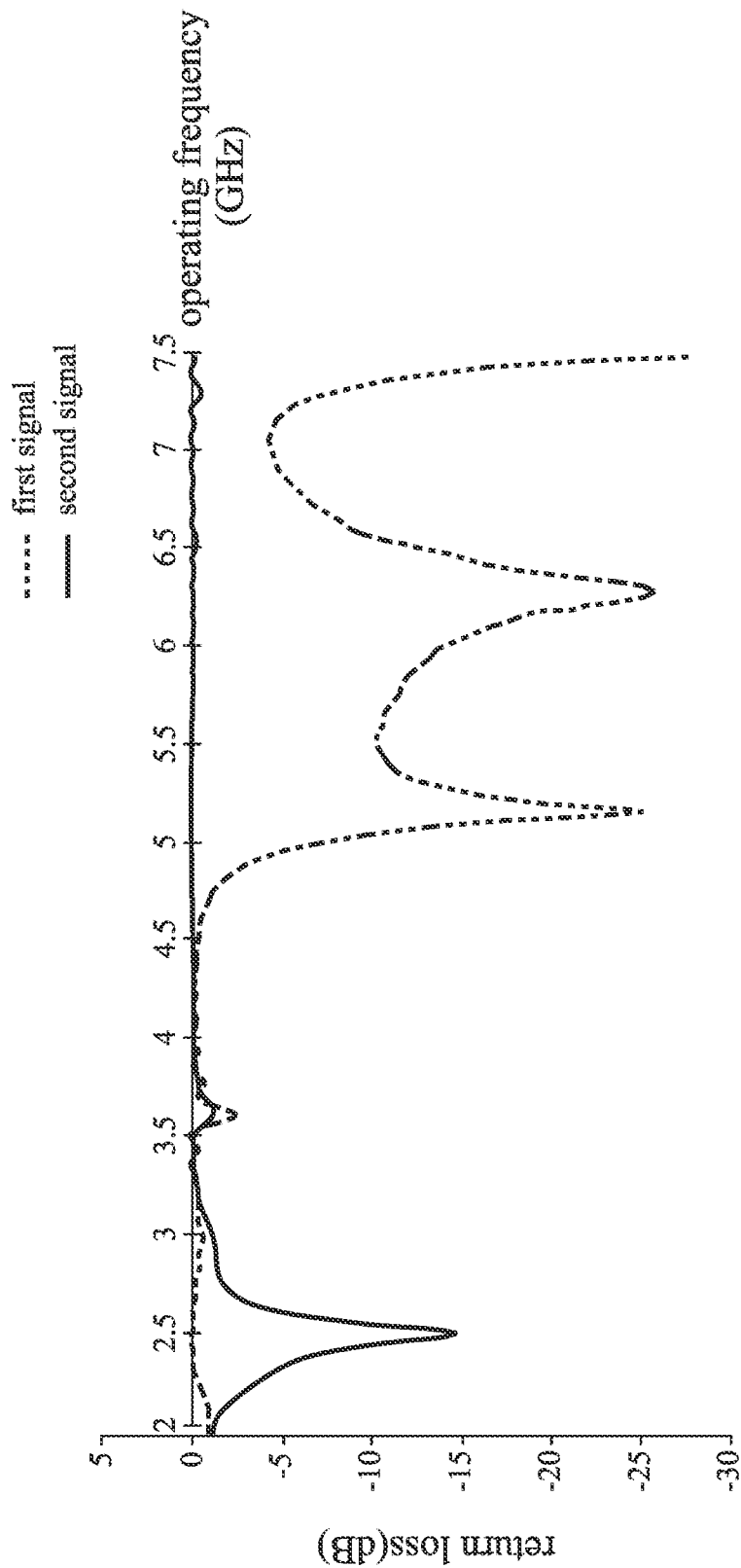
FIG. 11 is a measurement diagram of a return loss of the diplexer combined with the second antenna according to FIG. 7.
Figure 12:
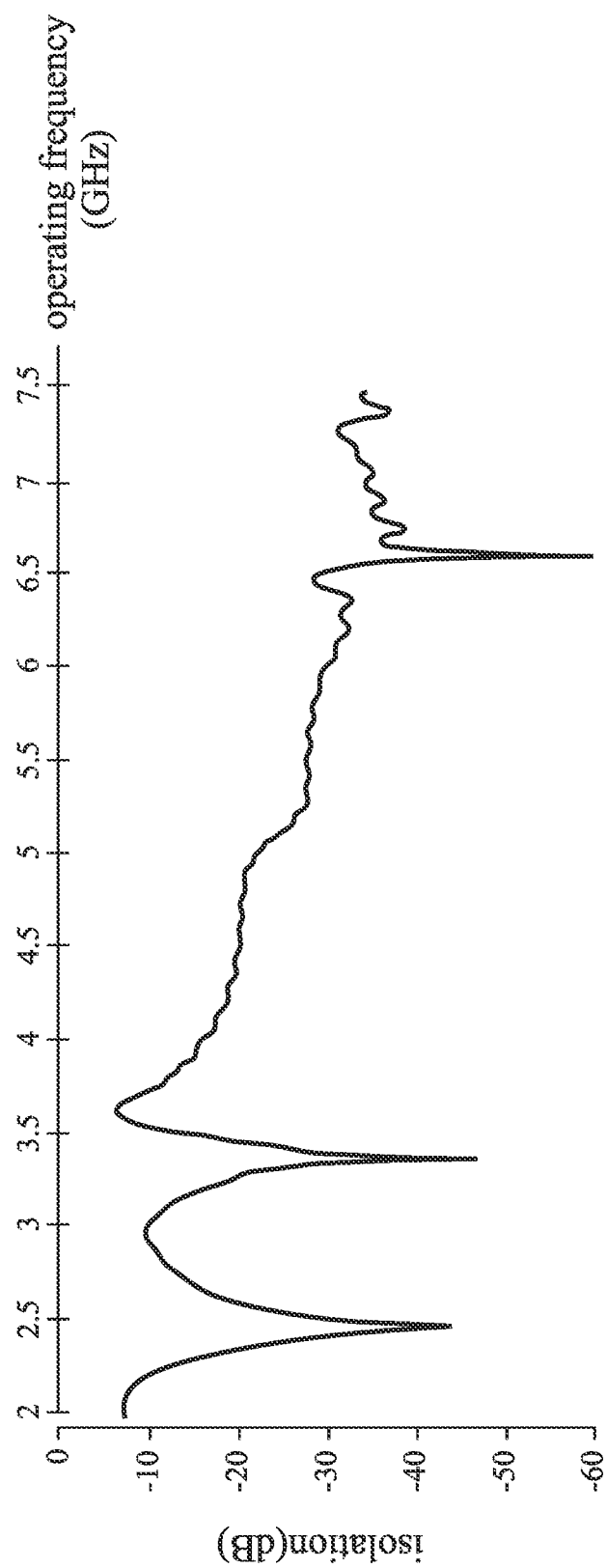
FIG. 12 is a measurement diagram of an isolation of the diplexer combined with the second antenna according to FIG. 7.
Figure 13:
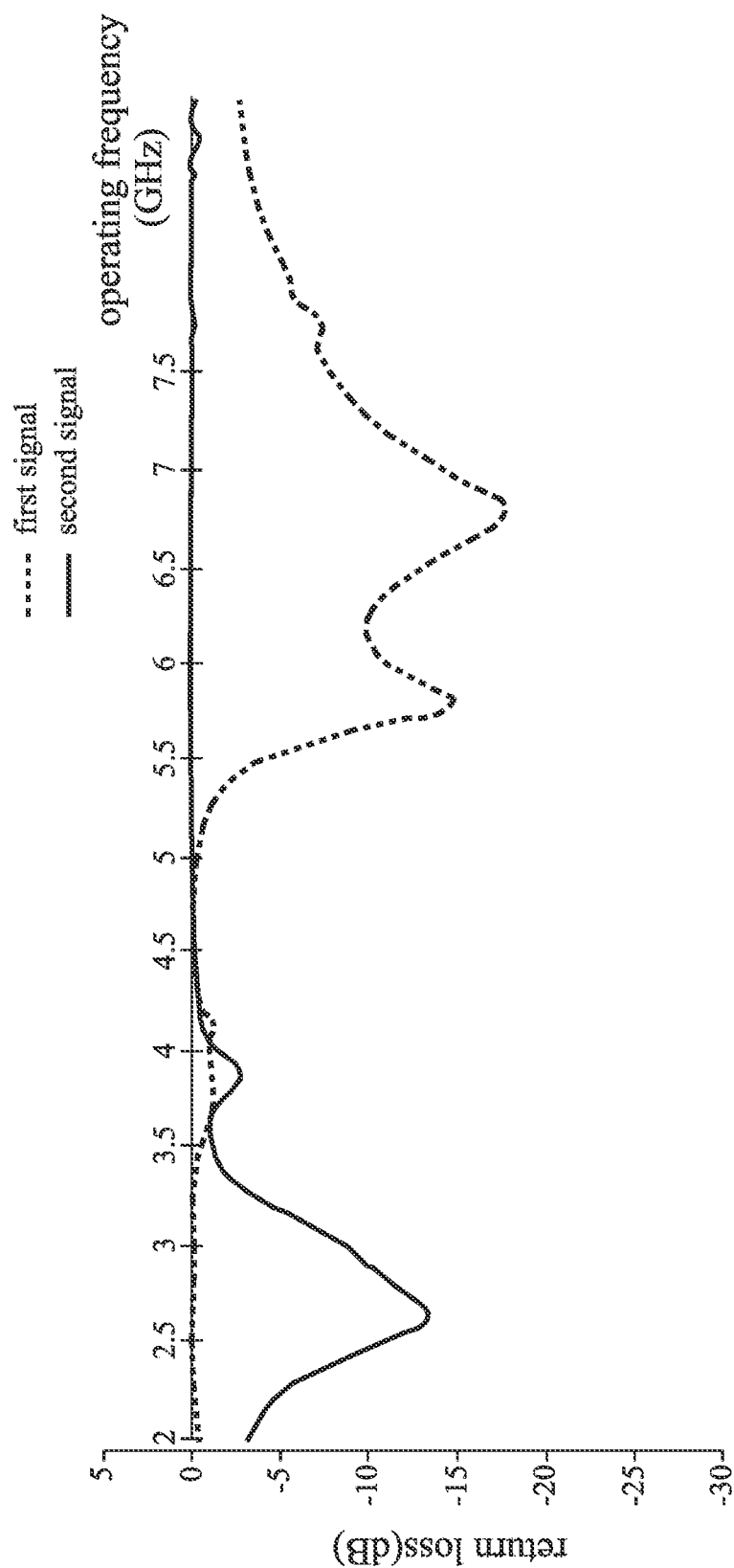
FIG. 13 is a measurement diagram of a return loss of the diplexer combined with the third antenna according to FIG. 8.
Figure 14:
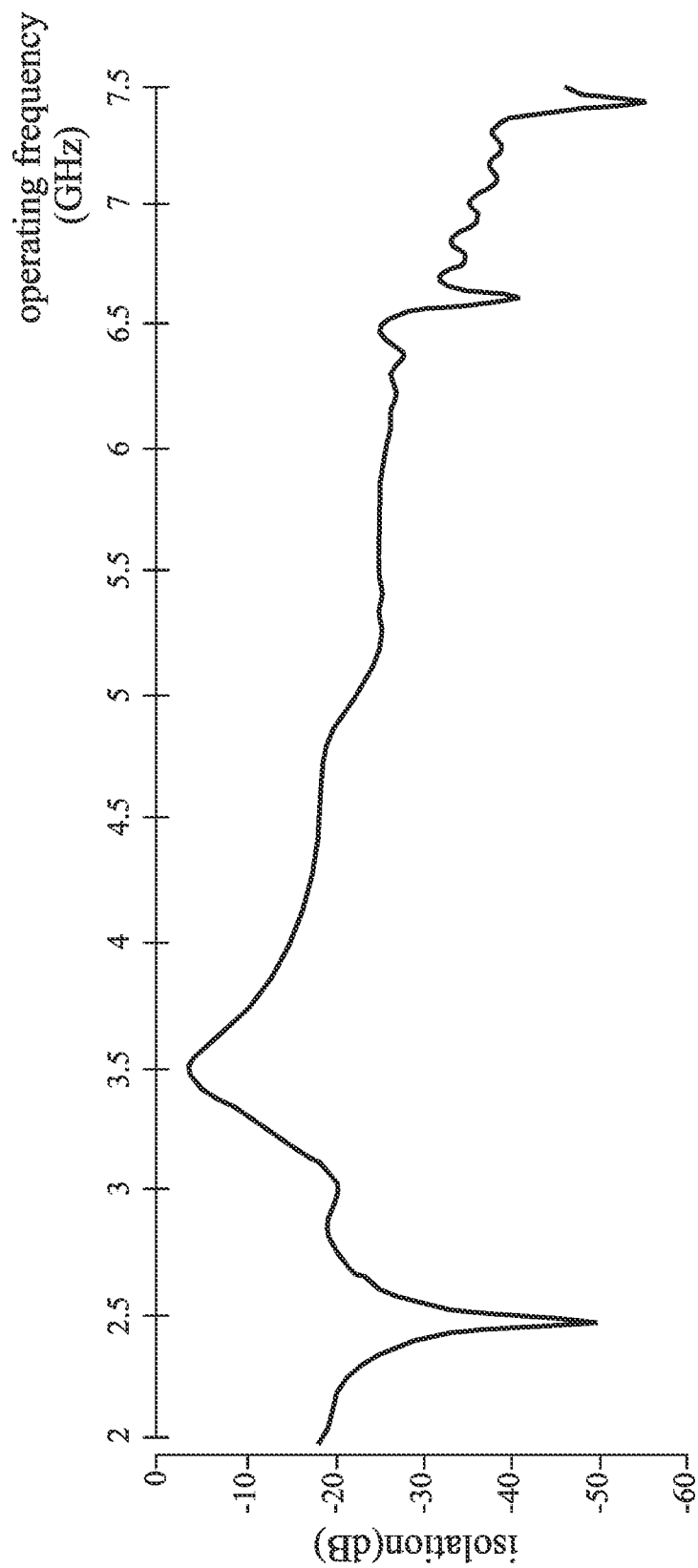
FIG. 14 is a measurement diagram of an isolation of the diplexer combined with the third antenna according to FIG. 8.

Please refer from FIG. 6 to FIG. 14, wherein FIG. 6 is a schematic view of the diplexer 100 combined with a first antenna Ant1 according to FIG. 1; FIG. 7 is a schematic view of the diplexer 100 combined with a second antenna Ant2 according to FIG. 1; FIG. 8 is a schematic view of the diplexer 100 combined with a third antenna Ant3 according to FIG. 1; FIG. 9 is a measurement diagram of a return loss of the diplexer 100 combined with the first antenna Ant1 according to FIG. 6; FIG. 10 is a measurement diagram of an isolation of the diplexer 100 combined with the first antenna Ant1 according to FIG. 6; FIG. 11 is a measurement diagram of a return loss of the diplexer 100 combined with the second antenna Ant2 according to FIG. 7; FIG. 12 is a measurement diagram of an isolation of the diplexer 100 combined with the second antenna Ant2 according to FIG. 7; FIG. 13 is a measurement diagram of a return loss of the diplexer 100 combined with the third antenna Ant3 according to FIG. 8; and FIG. 14 is a measurement diagram of an isolation of the diplexer 100 combined with the third antenna Ant3 according to FIG. 8. As the figures show, the first antenna Ant1 is a dual-band monopole antenna, the second antenna Ant2 is a dual-band dipole antenna, and the third antenna Ant3 is a dual-band planar inverted-F antenna. As shown in the measurement diagrams, the return losses of both the first signal and the second signal in a printed circuit of the diplexer 100 combined with any one of the first antenna Ant1, the second antenna Ant2, and the third antenna Ant3 are below −10 dB, and the isolations thereof are below −20 dB.

Figure 15:
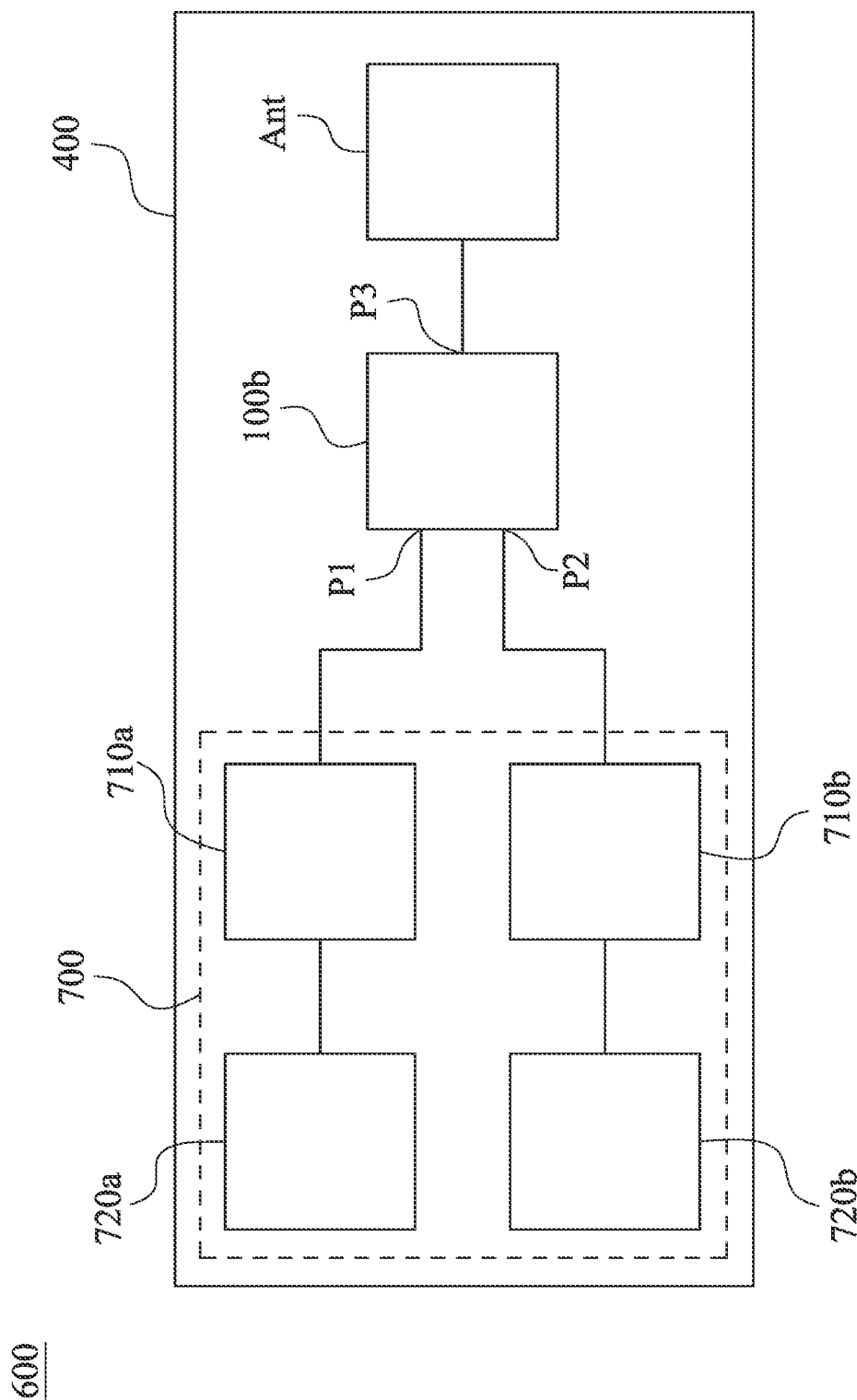
FIG. 15 is a schematic block diagram of a radio frequency circuit according to a $3^{rd}$ embodiment of the present disclosure.

Please refer from FIG. 2 to FIG. 15, wherein FIG. 15 is a schematic block diagram of a radio frequency circuit 600 according to a $3^{rd}$ embodiment of the present disclosure. The radio frequency circuit 600 includes an antenna Ant, a diplexer 100b, a transceiver circuit 700, a substrate 400 and a grounding layer (its reference numeral is omitted).

The antenna Ant can be one of the first antenna Ant1, the second antenna Ant2 and the third antenna Ant3.

The diplexer 100b includes a first transmitting port P1, a second transmitting port P2, a third transmitting port P3, a first node, a second node, a third node, a first transmission line, the second transmission line, the third transmission line, the first frequency band unit and the second frequency band unit. A structure thereof is the same as a structure corresponding to the diplexer 100 according to FIG. 2, and the structure is not mentioned here.

The transceiver circuit 700 is electrically connected to the diplexer 100b and includes a radio frequency unit and a baseband unit. The radio frequency unit includes a first radio frequency module 710a and a second radio frequency module 710b. The baseband unit includes a first baseband module 720a and a second baseband module 720b. The first radio frequency module 710a is electrically connected between the first transmitting port P1 of the diplexer 100b and the first baseband module 720a. The second radio frequency module 710b is electrically connected between the second transmitting port P2 of the diplexer 100b and the second baseband module 720b. The first baseband module 720a generates a first baseband signal, and the first radio frequency module 710a is configured to convert the first baseband signal to the first signal (that is, a high frequency signal). The second baseband module 720b generates a second baseband signal, and the second radio frequency module 710b is configured to convert the second baseband signal to the second signal (that is, a low frequency signal).

The substrate 400 has an upper surface (not shown) and a bottom surface (not shown), and all of the antenna Ant, the diplexer 100b and the transceiver circuit 700 are disposed at the upper surface. The grounding layer is disposed at the bottom surface. Hence, the radio frequency circuit 600 of the present disclosure uses the microstrip lines to implement the diplexer 100b on the shared substrate 400 without using RF cables in order to avoid a problem of using two different substrates connected by RF cables for antennas and other circuits (such as a diplexer and a transceiver circuit) in the prior art. That is, each of the antenna Ant, the first transmission line 110, the second transmission line 120 and the third transmission line 130 is implemented by a microstrip line, and the third transmitting port P3 is directly connected to the antenna Ant.

As shown in the aforementioned embodiments, the present disclosure has the following advantages. First, the printed diplexer not only can be applied to the shared antenna structure but also can increase a bandwidth by using a resonant circuit to adjust the expected operating frequency. Second, the printed diplexer without the resonant circuit, has a simpler circuit structure and a narrower bandwidth, and can also be applied to a shared antenna structure. Third, the radio frequency circuit uses microstrip lines to implement the diplexer on a shared substrate without using RF cables in order to avoid a problem of using two different substrates connected by RF cables for antennas and other circuits in the prior art. That is, each of the antenna, the first transmission line, the second transmission line and the third transmission line is implemented by a microstrip line, and the third transmitting port is directly connected to the antenna.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A diplexer, which is configured to transmit a first signal having a first frequency and a second signal having a second frequency, the first frequency higher than the second frequency, and the diplexer comprising:
    a first transmitting port configured to transmit the first signal;
    a second transmitting port configured to transmit the second signal;
    a third transmitting port configured to transmit the first signal and the second signal;
    a first frequency band unit electrically connected between the first transmitting port and the third transmitting port and comprising:
    a first filter configured to filter the second signal; and
    a resonant circuit electrically connected to the first filter and configured to adjust an operating frequency of the first frequency band unit; and
    a second frequency band unit electrically connected between the second transmitting port and the third transmitting port and comprising:
    at least one second filter configured to filter the first signal;
    a first node located between the first transmitting port and the third transmitting port;
    a first transmission line connected between the first transmitting port and the first node;
    a second node located between the at least one second filter and the second transmitting port;
    a second transmission line connected between the second transmitting port and the second node;
    a third node located between the first node and the third transmitting port;
    a third transmission line connected between the third transmitting port and the third node;
    wherein the first transmission line, the second transmission line and the third transmission line have a line width;
    wherein the resonant circuit is connected between the first node and the third node and comprises:
    a plurality of line segments, wherein each of the line segments has a line segment width; and
    a plurality of turning zones, wherein one of a part of the turning zones is connected between two of the line segments next to each other;
    wherein the line segment width relative to the line width has a line-width ratio, and the line-width ratio is between 0.5 and 2.

2. The diplexer of claim 1, wherein the first filter comprises:
    a first metal unit connected to the first node and extending along a first direction; and
    a second metal unit connected to the first node and extending along a second direction, wherein the second direction is different from the first direction.

3. The diplexer of claim 2, wherein the first filter further comprises:
    a third metal unit connected to the first metal unit and having a capacitance width, wherein the capacitance width is greater than or equal to the line width; and
    a fourth metal unit connected to the second metal unit, wherein a shape of the fourth metal unit is the same as a shape of the third metal unit.

4. The diplexer of claim 1, wherein each of the line segments has a line segment length, each of the turning zones has a turning length, a total of the line segment lengths of the line segments and the turning lengths of the turning zones is a resonant length, the resonant length relative to a wavelength of the first signal having the first frequency has a length ratio, and the length ratio is between 0.1 and 0.5.

5. The diplexer of claim 1, wherein at least one coupling distance is formed between the line segments and the turning zones, the at least one coupling distance relative to the line width has a distance ratio, and the distance ratio is between 0.05 and 1.5.

6. The diplexer of claim 5, wherein a number of the at least one coupling distance is two, and one of the two coupling distances is greater than the other one coupling distance.

7. The diplexer of claim 1, wherein a number of the at least one second filter is plural, the second filters are connected between the second node and the third node and are connected in series, and the second filters comprise:
    a first-order low-pass filter comprising:
    a first-segment metal unit connected to the third node; and
    a second-segment metal unit connected between the first-segment metal unit and the second node and having a first horizontal length; and
    a second-order low-pass filter connected between the first-order low-pass filter and the second node and comprising:
    a third-segment metal unit connected to the second-segment metal unit; and
    a fourth-segment metal unit connected between the third-segment metal unit and the second node and having a second horizontal length, wherein the second horizontal length is shorter than the first horizontal length.

8. The diplexer of claim 7, wherein the second frequency band unit further comprises:
    a branch line segment connected between the second filters and the third node and having a branch line segment width, wherein the branch line segment width is equal to the line width;
    wherein the first-segment metal unit and the third-segment metal unit have a metal line width, and the metal line width is shorter than the line width.

9. The diplexer of claim 1, further comprising:
    a substrate having an upper surface and a bottom surface, wherein both of the first frequency band unit and the second frequency band unit are disposed at the upper surface; and
    a grounding layer disposed at the bottom surface.

10. A diplexer, which is configured to transmit a first signal having a first frequency and a second signal having a second frequency, the first frequency higher than the second frequency, and the diplexer comprising:
    a first transmitting port configured to transmit the first signal;

a second transmitting port configured to transmit the second signal;
a third transmitting port configured to transmit the first signal and the second signal;
a first frequency band unit electrically connected between the first transmitting port and the third transmitting port, and comprising:
a first filter configured to filter the second signal; and
a second frequency band unit electrically connected between the second transmitting port and the third transmitting port, and comprising:
at least one second filter configured to filter the first signal;
a first node located between the first transmitting port and the third transmitting port;
a first transmission line connected between the first transmitting port and the first node;
a second node located between the at least one second filter and the second transmitting port;
a second transmission line connected between the second transmitting port and the second node;
a third node located between the first node and the third transmitting port; and
a third transmission line connected between the third transmitting port and the third node;
wherein the first transmission line, the second transmission line and the third transmission line have a line width;
wherein a number of the at least one second filter is plural, the second filters are connected between the second node and the third node and are connected in series, and the second filters comprise:
a first-order low-pass filter comprising:
a first-segment metal unit connected to the third node; and
a second-segment metal unit connected between the first-segment metal unit and the second node and having a first horizontal length; and
a second-order low-pass filter connected between the first-order low-pass filter and the second node, and comprising:
a third-segment metal unit connected to the second-segment metal unit; and
a fourth-segment metal unit connected between the third-segment metal unit and the second node and having a second horizontal length, wherein the second horizontal length is shorter than the first horizontal length.

11. The diplexer of claim 10, wherein the first filter comprises:
a first metal unit connected to the first node and extending along a first direction; and
a second metal unit connected to the first node and extending along a second direction, wherein the second direction is different from the first direction.

12. The diplexer of claim 11, wherein the first filter further comprises:

a third metal unit connected to the first metal unit and having a capacitance width, wherein the capacitance width is greater than or equal to the line width; and
a fourth metal unit connected to the second metal unit, wherein a shape of the fourth metal unit is the same as a shape of the third metal unit.

13. A radio frequency circuit, configured to transmit a first signal having a first frequency and a second signal having a second frequency, the first frequency higher than the second frequency, and the radio frequency circuit comprising:
an antenna;
a diplexer electrically connected to the antenna, and comprising:
a first transmitting port configured to transmit the first signal;
a second transmitting port configured to transmit the second signal;
a third transmitting port configured to transmit the first signal and the second signal;
a first frequency band unit electrically connected between the first transmitting port and the third transmitting port, and comprising:
a first filter configured to filter the second signal; and
a second frequency band unit electrically connected between the second transmitting port and the third transmitting port, and comprising:
at least one second filter configured to filter the first signal;
a first node located between the first transmitting port and the third transmitting port;
a first transmission line connected between the first transmitting port and the first node;
a second node located between the at least one second filter and the second transmitting port;
a second transmission line connected between the second transmitting port and the second node;
a third node located between the first node and the third transmitting port; and
a third transmission line connected between the third transmitting port and the third node;
a transceiver circuit electrically connected to the diplexer;
a substrate having an upper surface and a bottom surface, wherein all of the antenna, the diplexer and the transceiver circuit are disposed at the upper surface; and
a grounding layer disposed at the bottom surface;
wherein each of the antenna, the first transmission line, the second transmission line and the third transmission line is implemented by a microstrip line, and the third transmitting port is directly connected to the antenna.

14. The radio frequency circuit of claim 13, wherein the first frequency band unit further comprises:
a resonant circuit electrically connected to the first filter and configured to adjust an operating frequency of the first frequency band unit.

* * * * *